United States Patent
Lee et al.

(10) Patent No.: US 10,643,304 B2
(45) Date of Patent: May 5, 2020

(54) IMAGE PROVIDING APPARATUS AND METHOD

(71) Applicant: Hanwha Techwin Co., Ltd., Seongnam-si (KR)

(72) Inventors: Ho Jung Lee, Seongnam-si (KR); Yeon Woo Kim, Seongnam-si (KR); Jeong Hun Lee, Seongnam-si (KR); Hyun Ho Kim, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 16/329,462

(22) PCT Filed: Nov. 8, 2016

(86) PCT No.: PCT/KR2016/012792
§ 371 (c)(1),
(2) Date: Feb. 28, 2019

(87) PCT Pub. No.: WO2018/084347
PCT Pub. Date: May 11, 2018

(65) Prior Publication Data
US 2019/0251658 A1 Aug. 15, 2019

(30) Foreign Application Priority Data
Nov. 3, 2016 (KR) .................... 10-2016-0145829

(51) Int. Cl.
*H04N 7/14* (2006.01)
*G06T 3/40* (2006.01)
(Continued)

(52) U.S. Cl.
CPC .................. *G06T 3/40* (2013.01); *G06T 7/00* (2013.01); *H04N 5/265* (2013.01); *H04N 5/272* (2013.01);
(Continued)

(58) Field of Classification Search
CPC ....................................................... H04N 7/14
See application file for complete search history.

(56) References Cited

U.S. PATENT DOCUMENTS 5,881,163 A * 3/1999 Slump .................. H04N 3/1593
348/584
5,974,165 A * 10/1999 Giger .................... G06T 3/0075
382/132
(Continued)

FOREIGN PATENT DOCUMENTS

KR   10-2003-0002919 A   1/2003
KR   10-2009-0100741 A   9/2009
(Continued)

OTHER PUBLICATIONS

International Search Report (PCT/ISA/210) dated Aug. 4, 2017 issued by the International Searching Authority in International Application No. PCT/KR2016/012792.
(Continued)

*Primary Examiner* — Olisa Anwah
(74) *Attorney, Agent, or Firm* — Sughrue Mion, PLLC

(57) ABSTRACT

Provided is an image providing method including generating a first layer on which a first image is displayed; generating a second layer on which a second image is displayed, the second image being different from the first image; generating a mask based on a position of a region of interest in the first image; and generating a display image based on at least one of the first layer, the second layer, and the mask.

18 Claims, 9 Drawing Sheets

(51) Int. Cl.
*H04N 5/272* (2006.01)
*H04N 21/431* (2011.01)
*H04N 5/265* (2006.01)
*G06T 7/00* (2017.01)
*H04N 7/18* (2006.01)

(52) U.S. Cl.
CPC ............... *H04N 7/18* (2013.01); *H04N 7/181* (2013.01); *H04N 21/431* (2013.01)

(56) References Cited

U.S. PATENT DOCUMENTS

| | | | | |
|---|---|---|---|---|
| 6,454,410 | B1* | 9/2002 | Berger | A61B 3/0041 |
| | | | | 351/206 |
| 9,607,391 | B2* | 3/2017 | Price | |
| 10,389,954 | B2* | 8/2019 | Shin | H04N 5/2258 |
| 2006/0098897 | A1* | 5/2006 | Dewaele | G06K 9/6203 |
| | | | | 382/294 |
| 2007/0183661 | A1* | 8/2007 | El-Maleh | G06K 9/00234 |
| | | | | 382/173 |
| 2008/0089584 | A1* | 4/2008 | VanMetter | A61B 6/463 |
| | | | | 382/173 |
| 2010/0002070 | A1* | 1/2010 | Ahiska | G08B 13/19691 |
| | | | | 348/36 |
| 2011/0052002 | A1* | 3/2011 | Cobb | G06K 9/00771 |
| | | | | 382/103 |
| 2011/0181716 | A1* | 7/2011 | McLeod | H04N 7/181 |
| | | | | 348/143 |
| 2012/0062732 | A1* | 3/2012 | Marman | H04N 7/18 |
| | | | | 348/142 |
| 2013/0136332 | A1* | 5/2013 | Uehara | A61B 6/4441 |
| | | | | 382/132 |
| 2015/0262553 | A1* | 9/2015 | Nam | G06K 9/3233 |
| | | | | 345/619 |
| 2015/0296177 | A1 | 10/2015 | Pinter et al. | |
| 2017/0161569 | A1* | 6/2017 | Ren | G06K 9/00798 |
| 2018/0295400 | A1* | 10/2018 | Thomas | H04N 21/85406 |

FOREIGN PATENT DOCUMENTS

| | | |
|---|---|---|
| KR | 10-2010-0013106 A | 2/2010 |
| KR | 10-2012-0115015 A | 10/2012 |
| KR | 10-2013-0104215 A | 9/2013 |
| KR | 10-2013-0127423 A | 11/2013 |
| KR | 10-1475895 B1 | 12/2014 |
| KR | 10-1514143 B1 | 4/2015 |
| WO | 2012/009245 A1 | 1/2012 |

OTHER PUBLICATIONS

Written Opinion (PCT/ISA/237) dated Aug. 4, 2017 issued by the International Searching Authority in International Application No. PCT/KR2016/012792.

* cited by examiner

IMAGE PROVIDING APPARATUS AND METHOD

TECHNICAL FIELD

The present disclosure relates to an image providing apparatus and method.

BACKGROUND ART

These days, many surveillance cameras are installed everywhere, and techniques of sensing occurrence of an event in an image obtained by a surveillance camera and recording and storing the image have been developed.

In particular, with an increase in the number of installed surveillance cameras, multi-channel image display systems that receive images from a plurality of cameras and monitor a monitoring-target area have been developed.

However, such image display systems provide a live image and a recorded image using different layouts and interfaces, and therefore, a user who is watching the live image needs to change a mode to watch the recorded image.

DESCRIPTION OF EMBODIMENTS

Technical Problem

Provided is an image providing apparatus and method for allowing a recorded image to be immediately checked via a simple operation on a live image.

Provided is an image providing apparatus and method for allowing a recorded image corresponding to a certain portion of a live image to be checked.

Provided is an image providing apparatus and method for allowing a region of interest or an object of interest to be monitored intensively.

Provided is an image providing apparatus and method for allowing multi-viewpoint images to be watched focusing on a region of interest.

Solution to Problem

According to an aspect of the present disclosure, an image providing method includes generating a first layer on which a first image is displayed; generating a second layer on which a second image is displayed, the second image being different from the first image; generating a mask based on a position of a region of interest in the first image; and generating a display image based on at least one of the first layer, the second layer, and the mask.

In an embodiment, the generating of the display image may include generating a masked second layer by applying the mask to the second layer and generating the display image by overlapping the first layer with the masked second layer. At this time, the generating of the masked second layer may include processing the second layer such that a region corresponding to a remaining region excluding the region of interest is transparent on the second layer.

In another embodiment, the generating of the display image may include generating a masked first layer by applying the mask to the first layer and generating the display image by overlapping the second layer with the masked first layer. At this time, the generating of the masked first layer may include processing the first layer such that a region corresponding to the region of interest is transparent on the first layer.

In another embodiment, the generating of the display image may include generating the display image based on a first partial region and a second partial region, the first partial region being a remaining region excluding a region corresponding to the region of interest on the first layer, and the second partial region corresponding to the region of interest on the second layer.

The generating of the mask may include setting the region of interest based on a user input with respect to the first image.

The setting of the region of interest may include obtaining a first input for a first point on the first image, obtaining a second input for a second point on the first image, the second input being consecutive to the first input, and determining the region of interest based on the first input and the second input.

The setting of the region of interest may further include, after the determining of the region of interest, changing at least one of the position and a size of the region of interest based on the user input.

The generating of the mask may further include updating the region of interest based on a moved position of an object of interest in the first image.

A plurality of regions of interest may be provided, and the generating of the mask may include generating the mask based on a position of each of the plurality of regions of interest.

The image providing method may further include displaying the display image.

The first image may be a live image, the second image may be a recorded image, and the generating of the second layer may include obtaining a user input regarding a display time point of the second image.

The displaying of the display image may include further displaying a time slider showing at least one display time point, and the obtaining of the user input regarding the display time point may include obtaining the user input on the time slider.

According to another aspect of the present disclosure, an image providing apparatus includes a controller configured to generate a first layer, a second layer, and a mask and to generate a display image based on at least one of the first layer, the second layer, and the mask.

The controller may generate the first layer on which a first image is displayed, may generate the second layer on which a second image is displayed, the second image being different from the first image, may generate the mask based on a position of a region of interest in the first image, and may generate the display image based on the at least one of the first layer, the second layer, and the mask.

The controller may generate a masked second layer by applying the mask to the second layer and generate the display image by overlapping the first layer with the masked second layer, and the masked second layer may be obtained by processing the second layer such that a region corresponding to a remaining region excluding the region of interest is transparent on the second layer.

The controller may generate a masked first layer by applying the mask to the first layer and generate the display image by overlapping the second layer with the masked first layer, and the masked first layer may be obtained by processing the first layer such that a region corresponding to the region of interest is transparent on the first layer.

The controller may generate the display image based on a first partial region and a second partial region, the first partial region being a remaining region excluding a region corresponding to the region of interest on the first layer, and the second partial region corresponding to the region of interest on the second layer.

The controller may set the region of interest based on a user input with respect to the first image.

The controller may be further configured to update the region of interest based on a moved position of an object of interest in the first image.

A plurality of regions of interest may be provided, and the controller may generate the mask based on a position of each of the plurality of regions of interest.

The controller may display the display image on a display.

Other aspects, features, and advantages than those described above will be clear from the accompanying drawings, the claims, and the description of embodiments below.

ADVANTAGEOUS EFFECTS OF DISCLOSURE

According to embodiments, an image providing apparatus and method allowing a recorded image to be immediately checked via a simple operation on a live image may be realized.

According to embodiments, an image providing apparatus and method allowing a recorded image corresponding to a certain portion of a live image to be checked may be realized.

According to embodiments, an image providing apparatus and method allowing a region of interest or an object of interest to be monitored intensively may be realized.

According to embodiments, an image providing apparatus and method allowing multi-viewpoint images to be watched focusing on a region of interest may be realized.

BEST MODE

Figure 1:
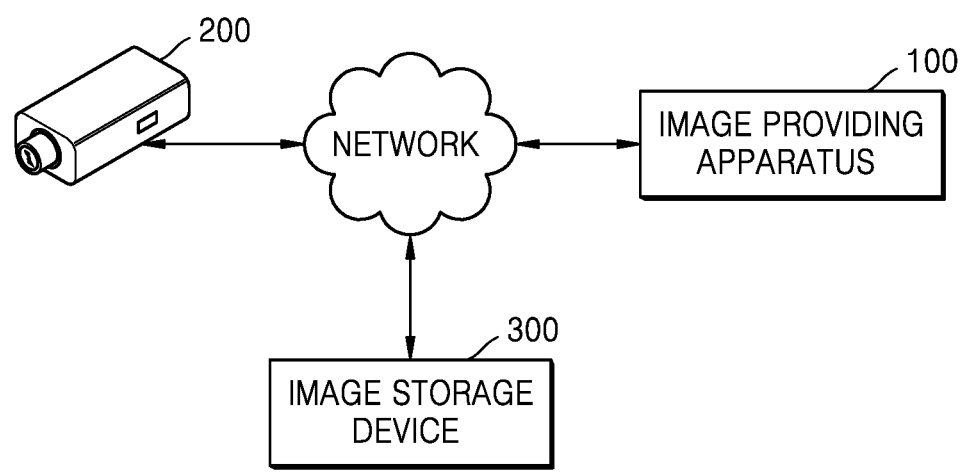
FIG. 1 schematically illustrates an image providing system according to an embodiment.

According to an embodiment, an image providing method includes generating a first layer on which a first image is displayed; generating a second layer on which a second image is displayed, the second image being different from the first image; generating a mask based on a position of a region of interest in the first image; and generating a display image based on at least one of the first layer, the second layer, and the mask.

Mode Of Disclosure

As embodiments allow for various changes and numerous embodiments, example embodiments will be illustrated in the drawings and described in detail in the written description. However, this is not intended to limit embodiments to particular modes of practice, and it is to be appreciated that all changes, equivalents, and substitutes that do not depart from the spirit and technical scope of the present disclosure are encompassed in embodiments. In the description of embodiments certain detailed explanations of the related art are omitted when it is deemed that they may unnecessarily obscure the essence of the present disclosure.

While such terms "first," "second," etc., may be used to describe various components, such components must not be limited to the above terms. The above terms are used only to distinguish one component from another.

The terms used in the present specification are merely used to describe example embodiments and are not intended to limit embodiments. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Embodiments may be described in terms of functional block components and various processing steps. Such functional blocks may be realized by any number of hardware and/or software components configured to perform the specified functions. For example, embodiments may employ various integrated circuit (IC) components, e.g., memory elements, processing elements, logic elements, look-up tables, and the like, which may carry out a variety of functions under the control of one or more microprocessors or other control devices. Similarly, where the elements of embodiments are implemented using software programming or software elements, embodiments may be implemented with any programming or scripting language such as C, C++, Java, assembler language, or the like, with the various algorithms being implemented with any combination of data structures, object, processes, routines or other programming elements. Functional aspects may be implemented in algorithms that are executed on one or more processors. Furthermore, embodiments could employ any number of conventional techniques for electronics configuration, signal processing and/or control, data processing and the like. The words "mechanism," "element," "means," and "configuration" are used broadly and are not limited to mechanical or physical embodiments, but can include software routines in conjunction with processors, etc.

FIG. 1 schematically illustrates an image providing system according to an embodiment.

Referring to FIG. 1, the image providing system may include an image providing apparatus 100, a surveillance camera 200, and an image storage device 300.

The surveillance camera 200 may include a lens and an image sensor. The lens may be a group of at least one lens. The image sensor may convert an image input via a lens into an electrical signal. For example, the image sensor may be a semiconductor device, such as a charge-coupled device (CCD) or a complementary metal oxide semiconductor (CMOS), which may convert an optical signal into an electrical signal (hereinafter, referred to as an image).

The surveillance camera 200 may be a camera which provides an RGB image, an infrared image, or a range image including distance information with respect to a capturing-target space.

The surveillance camera 200 may further include an event detecting unit. The event detecting unit may be a unit, such as a passive infrared (PIR) sensor or an infrared sensor, which detects motions of humans and/or animals. The event detecting unit may be a unit, such as a temperature sensor, a humidity sensor, or a gas sensor, which detects a change in an environment. The event detecting unit may compare previous and current images obtained over time with each other and determine occurrence or non-occurrence of an event. However, these are just examples, and the event detecting unit may vary with locations and/or purposes of the image providing system.

The surveillance camera 200 may be installed in a monitoring-target area. At this time, the monitoring-target area may be any of various spaces that need to be managed by a manager. For example, the monitoring-target area may be a space, such as an office, a public facility, a school, or a house, where there is concern about theft. The monitoring-target area may be a space, such as a factory, a plant, or an equipment room, where there is concern about accidents. However, these are just examples, and embodiments are not limited thereto.

The surveillance camera 200 may transmit an image obtained through a network to the image providing apparatus 100 and/or the image storage device 300. The network described herein may be a wireless network, a wired network, a public network like the Internet, a private network, a global system for mobile communications (GSM) network, a general packet radio service (GPRS) network, a local area network (LAN), a wide area network (WAN), a metropolitan area network (MAN), a cellular network, a public switched telephone network (PSTN), a personal area network, Bluetooth, Wi-Fi direct, near field communication, ultra wide band, a combination thereof, or another random network, but the network is not limited thereto.

One or more surveillance cameras 200 may be provided. Hereinafter, it is assumed that one surveillance camera 200 is provided for convenience of description.

The image storage device 300 may receive multimedia items such as images and audio, which are obtained by the surveillance camera 200, via the network and store the multimedia items. The image storage device 300 may also provide multimedia items such as images and audio, which are stored therein, at a request of the image providing apparatus 100.

The image storage device 300 may be any device which may store information dealt in electronic communication equipment and provide the information. The image storage device 300 may be a video management system (VMS), a central management system (CMS), a network video recorder (NVR), or a digital video recorder (DVR). The image storage device 300 may be a personal computer (PC) or a portable terminal. These are just examples, and embodiments are not limited thereto. Any device, which may receive images from the surveillance camera 200 via the network and display and/or store the images, may be used as the image storage device 300 with no limitations.

The image storage device 300 may have a unique identifier, i.e., a storage device identifier, for identifying the image storage device 300 on the network. At this time, the storage device identifier may be an Internet protocol (IP) address of the image storage device 300 or a media access control (MAC) address of the image storage device 300. In embodiments, one or more image storage devices 300 may be provided.

Figure 2:
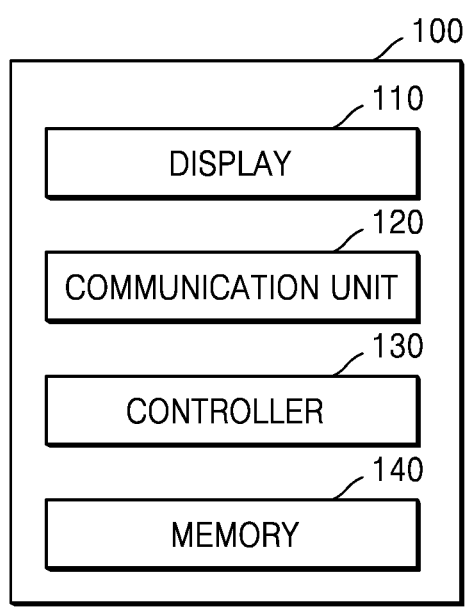
FIG. 2 schematically illustrates the configuration of an image providing apparatus according to an embodiment.

FIG. 2 schematically illustrates the configuration of the image providing apparatus 100 according to an embodiment.

Referring to FIG. 2, the image providing apparatus 100 may include a display 110, a communication unit 120, a controller 130, and a memory 140.

The display 110 may display a figure, a character, or an image according to an electrical signal generated by the controller 130. For example, the display 110 may include a cathode ray tube (CRT), a liquid crystal display (LCD), a plasma display panel (PDP), a light-emitting diode (LED), or an organic LED (OLED), but embodiments are not limited thereto.

The communication unit 120 may include hardware and software, which are necessary for allowing the image providing apparatus 100 to exchange control signals and/or images with external devices, such as the surveillance camera 200 and the image storage device 300, via wired/wireless connection.

The controller 130 may include any type of devices which may process data like a processor. Here, a processor may refer to a data processing device, which is embedded in hardware and has a circuit physically structured to execute a function expressed as code or commands in a program. An example of the data processing device embedded in hardware may be a microprocessor, a central processing unit (CPU), a processor core, a multiprocessor, an application-specific integrated circuit (ASIC), a field programmable gate array, etc. but embodiments are not limited thereto.

The memory 140 temporarily or permanently stores data processed in the image providing apparatus 100. The memory 140 may include a magnetic storage medium or a flash storage medium, but embodiments are not limited thereto.

The image providing apparatus 100 may be included in the image storage device 300. For example, the image providing apparatus 100 may be included in a VSM, a CMS, an NVR, or a DVR. The image providing apparatus 100 may be included in the surveillance camera 200. Hereinafter, for convenience of description, it is assumed that the image providing apparatus 100 is an independent apparatus.

In an embodiment, the controller 130 may generate a first layer, a second layer, and a mask and generate a display image based on at least one of the first layer, the second layer, and the mask.

For this operation, the controller 130 may generate the first layer on which a first image is displayed. Similarly, the controller 130 may generate the second layer on which a second image is displayed.

At this time, the first image may be different from the second image. For example, the first image may be a live image obtained by the surveillance camera 200 and the second image may be a recorded image obtained by the surveillance camera 200 in the past. At this time, the recorded image may have been stored in the image storage device 300.

Meanwhile, the term "layer" used in the first layer and the second layer may refer to a virtual layer used to overlap images. For example, when the first layer overlaps the second layer, the second image displayed on the second layer may be covered with the first image displayed on the first layer in an overlapping range between the first layer and the second layer.

In an embodiment, the controller 130 may generate the mask based on a region of interest in the first image.

Here, the term "region of interest" may refer to a region to be monitored in an image which has a different capturing viewpoint than an image currently watched by a user. For example, when a user finds a person acting suspiciously while watching a live image, the user may set a region including the person as the region of interest in the live image to closely observe the past behavior of the person.

As described above, the region of interest may be set based on a user input. In other words, the controller 130 may set the region of interest based on a user input with respect to the first image.

Figure 3:
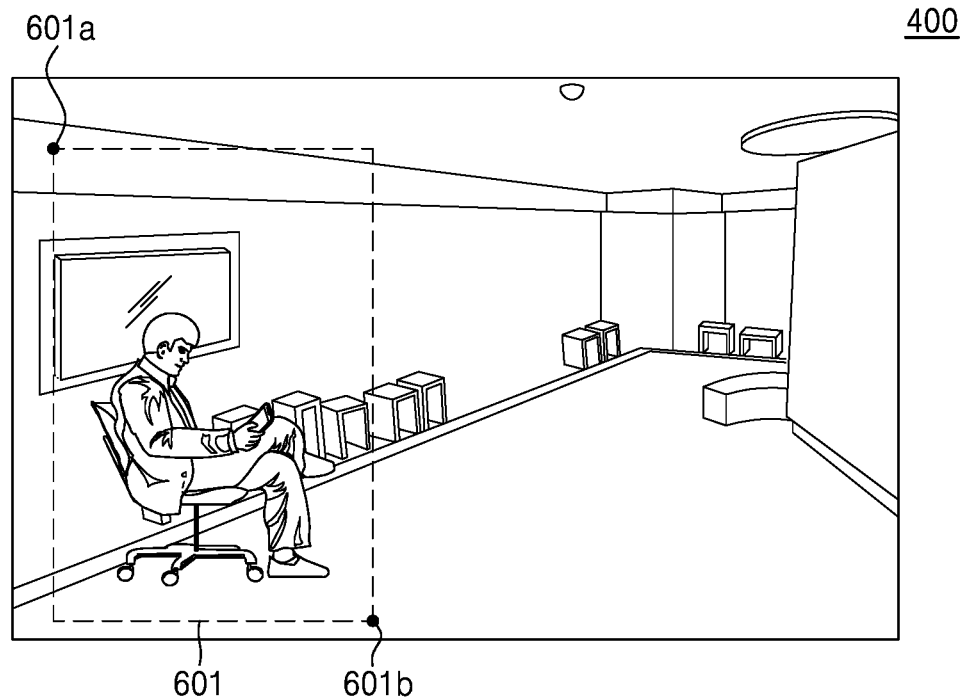
FIG. 3 illustrates that a controller sets a region of interest based on a user input, according to an embodiment.

FIG. 3 illustrates that the controller 130 sets a region of interest 601 based on a user input, according to an embodiment.

Referring to FIG. 3, it is assumed that a user finds a person acting suspiciously while watching a live image 400. In this case, the user may set the region of interest 601 by giving an input on the live image 400.

In detail, the controller 130 may obtain user inputs with respect to a first point 601a on the first image and a second point 601b different from the first point 601a and may determine the region of interest 601 based on the first and second points 601a and 601b. At this time, a first input and a second input may be consecutive inputs.

Here, the "consecutive inputs" may refer to a plurality of inputs connected via a drag input. For example, a first input may be an input (e.g., a click, a tap, or a touch) for a first point and a second input may be an input (e.g., release of a drag, a double-click, or a double-touch) for a second point.

In the case of FIG. 3, a user may set the region of interest 601 by giving inputs for the first point 601a and the second point 601b.

In an embodiment, the controller 130 may change at least one of the position and the size of a region of interest determined based on a user input. For example, in the case where the person in the region of interest 601 in FIG. 3 moves to the right and is not in the region of interest 601, a user may expand or move the region of interest 601 to the right such that the person to be observed is in a changed region of interest (not shown).

Meanwhile, the changing of the region of interest may be performed by the controller 130. In an embodiment, the controller 130 may update a region of interest based on a moved position of an object of interest in the first image. In the previous embodiment, the user has changed at least one of the position and the size of the region of interest 601 according to the movement of the person, i.e., the object of interest. However, in the current embodiment, the controller 130 may recognize the object of interest, locate the object of interest in an image, and change at least one of the position and the size of the region of interest based on the obtained location of the object of interest. Accordingly, a more meaningful region of interest may be set.

The controller 130 may obtain a user input for setting at least one region of interest and set the at least one region of interest in response to the user input. In this case, there may be one or more regions of interest in one image.

In an embodiment, the controller 130 may generate the mask based on the position of a region of interest in the first image. In other words, the controller 130 may generate the mask including position information of the region of interest in the first image.

Figure 4:
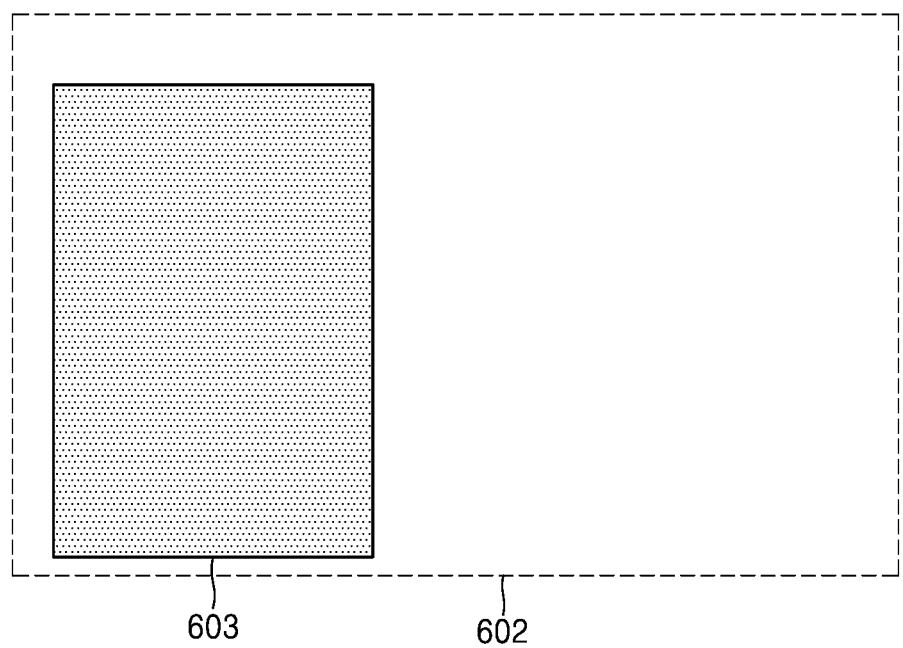
FIG. 4 illustrates a mask generated by a controller.

FIG. 4 illustrates a mask 602 generated by the controller 130.

For example, it is assumed that the region of interest 601 (in FIG. 3) has been set in the live image 400 (in FIG. 3) as shown in FIG. 3.

In this case, the controller 130 may generate the mask 602 which includes position information 603 of the region of interest 601 (in FIG. 3) in the live image 400 (in FIG. 3).

The generated mask may be used to extract and/or exclude a region corresponding to the region of interest or a remaining region excluding the region corresponding to the region of interest from a first or second layer. This will be described in detail below.

In an embodiment, the controller 130 may generate a display image based on at least one of a first layer, a second layer, and a mask.

FIGS. 5A through 7 are diagrams for explaining various methods of generating a display image using the controller 130.

Figure 5A:
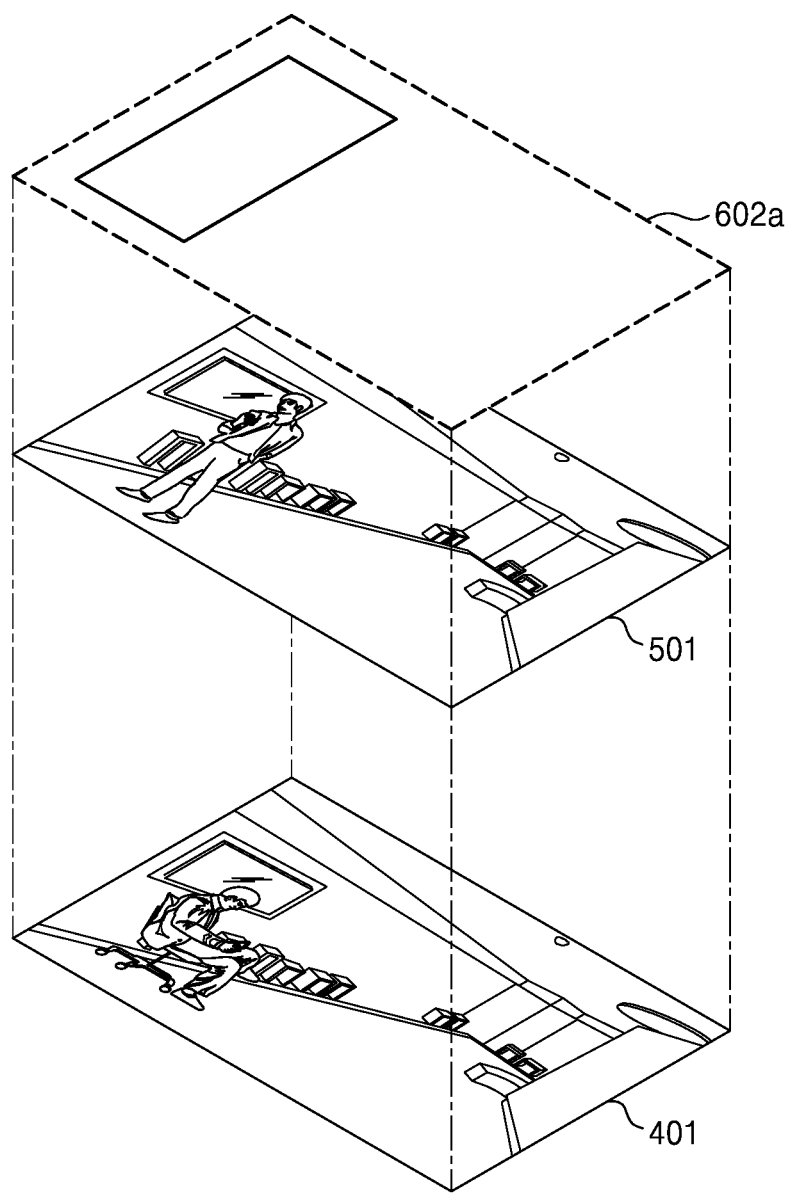
FIGS. 5A and 5B are diagrams for explaining a method of generating a display image using a controller using a first method, according to an embodiment.
Figure 5B:
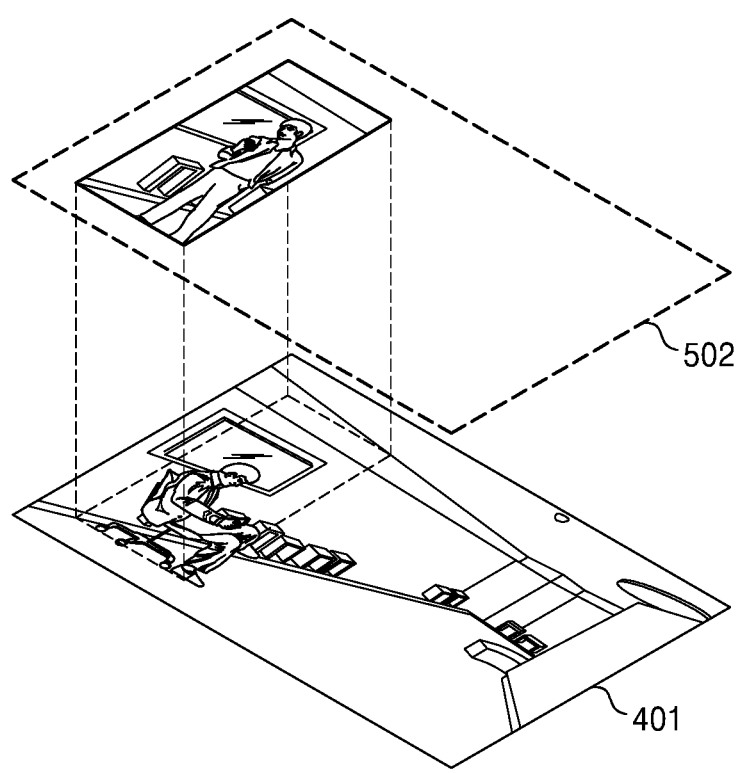

FIGS. 5A and 5B are diagrams for explaining a method of generating a display image using the controller 130 using a first method, according to an embodiment.

In an embodiment, the controller 130 may generate a masked second layer 502 by applying a mask 602a to a second layer 501. In detail, the controller 130 may process the second layer 501 such that a remaining region corresponding to a region excluding a region of interest on the second layer 501 is transparent, thereby generating the masked second layer 502. In other words, the controller 130 may generate the masked second layer 502 on which only a region corresponding to the region of interest is displayed and the remaining region is transparent.

Here, that a certain region of a current layer is "transparent" may refer to that an image of a layer below the current layer is displayed through the current layer. For example, a display image of a first layer 401 below the masked second layer 502 may be displayed in a region corresponding to a remaining region excluding a region of interest on the masked second layer 502.

Thereafter, the controller 130 may generate a display image by overlapping the first layer 401 with the masked second layer 502.

As such, in an embodiment, a first image, i.e., an entire image, and a second image, i.e., a partial image, may be simultaneously displayed. In particular, a recorded image corresponding to a certain portion of a live image may be easily checked.

Figure 6A:
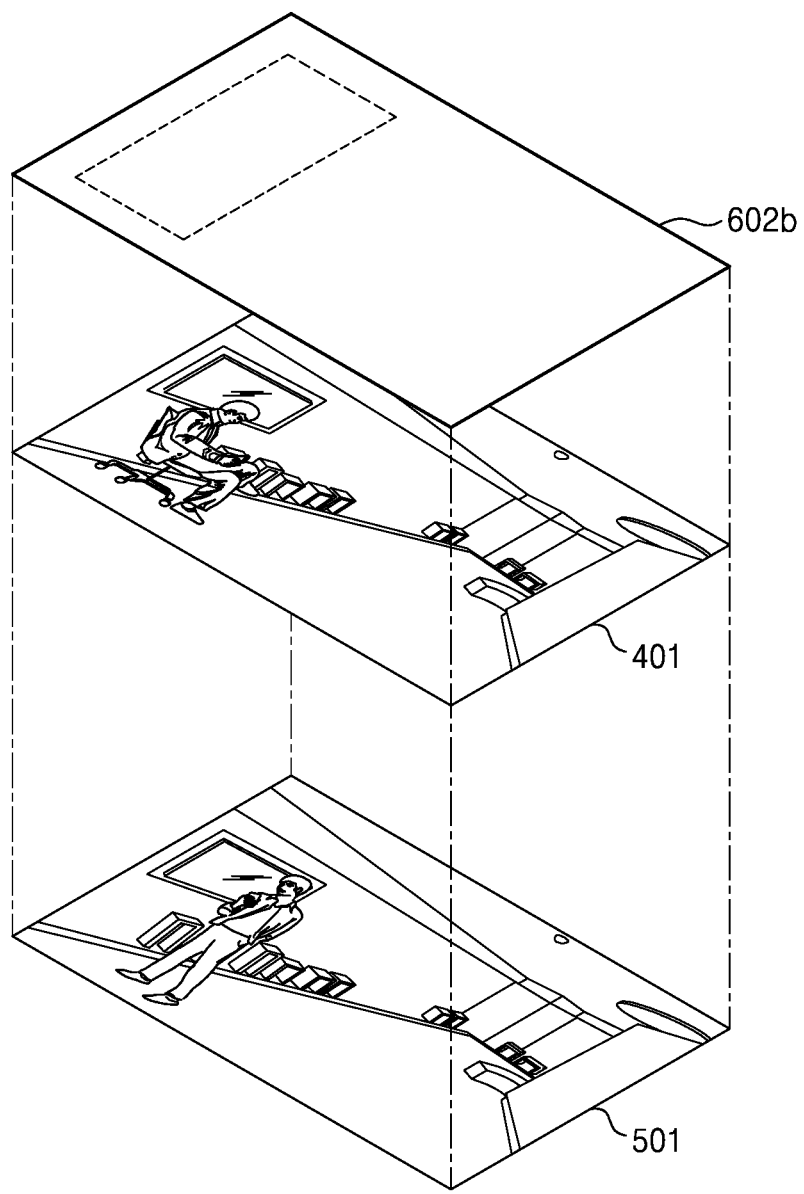
FIGS. 6A and 6B are diagrams for explaining a method of generating a display image using a controller using a second method, according to an embodiment.
Figure 6B:
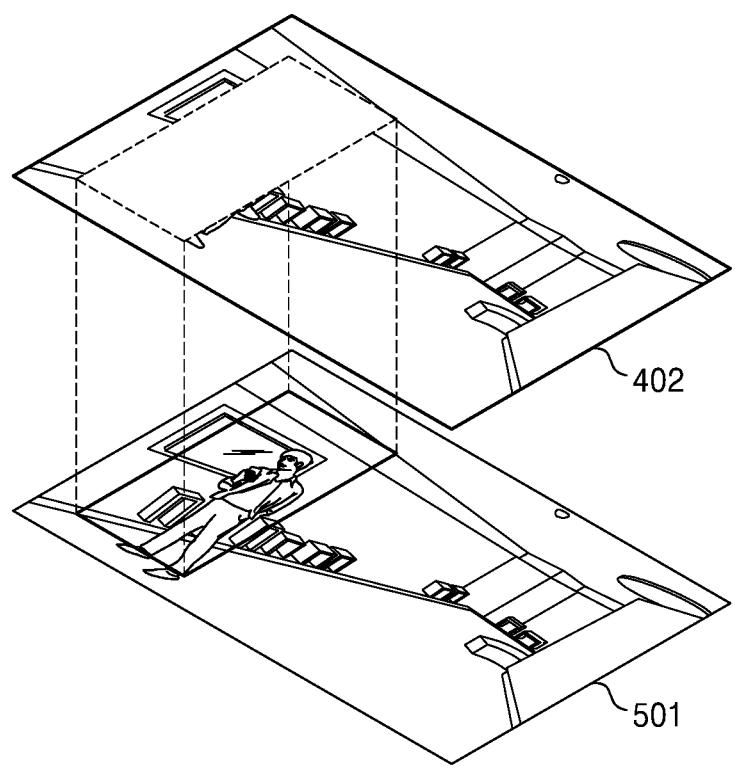

FIGS. 6A and 6B are diagrams for explaining a method of generating a display image using the controller 130 using a second method, according to an embodiment.

In an embodiment, the controller 130 may generate a masked first layer 402 by applying a mask 602b to a first layer 401. In detail, the controller 130 may process the first layer 401 such that a region corresponding to a region of interest on the first layer 401 is transparent, thereby generating the masked first layer 402. In other words, the controller 130 may generate the masked first layer 402 on which only a remaining region excluding the region corresponding to the region of interest is displayed and the region of interest is transparent.

Thereafter, the controller 130 may generate a display image by overlapping the second layer 501 with the masked first layer 402.

As such, in an embodiment, a first image, i.e., an entire image, and a second image, i.e., a partial image, may be simultaneously displayed. In particular, a recorded image corresponding to a certain portion of a live image may be easily checked.

Figure 7:
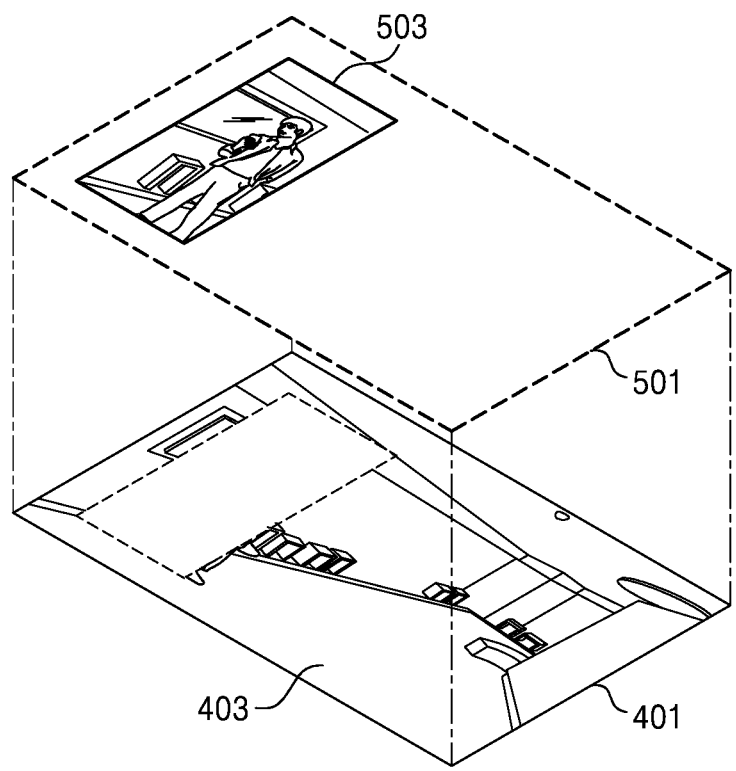
FIG. 7 is a diagram for explaining a method of generating a display image using a controller using a third method, according to an embodiment.

FIG. 7 is a diagram for explaining a method of generating a display image using the controller 130 using a third method, according to an embodiment.

In an embodiment, the controller 130 may generate a display image based on a first partial region 403, which is a remaining region excluding a region corresponding to a region of interest on the first layer 401, and a second partial region 503, which corresponds to the region of interest on the second layer 501. In other words, the controller 130 may generate the display image by merging the first partial region 403 and the second partial region 503 into a single image.

In an embodiment, the controller 130 may display the display image, which has been generated using the method described above, on the display 110.

At this time, the controller 130 may obtain a user input regarding a display time point of a second image. For example, the controller 130 may obtain a user input regarding a display time point of a second image by displaying a time slider showing at least one display time point and obtaining a user input on the time slider.

Figure 8:
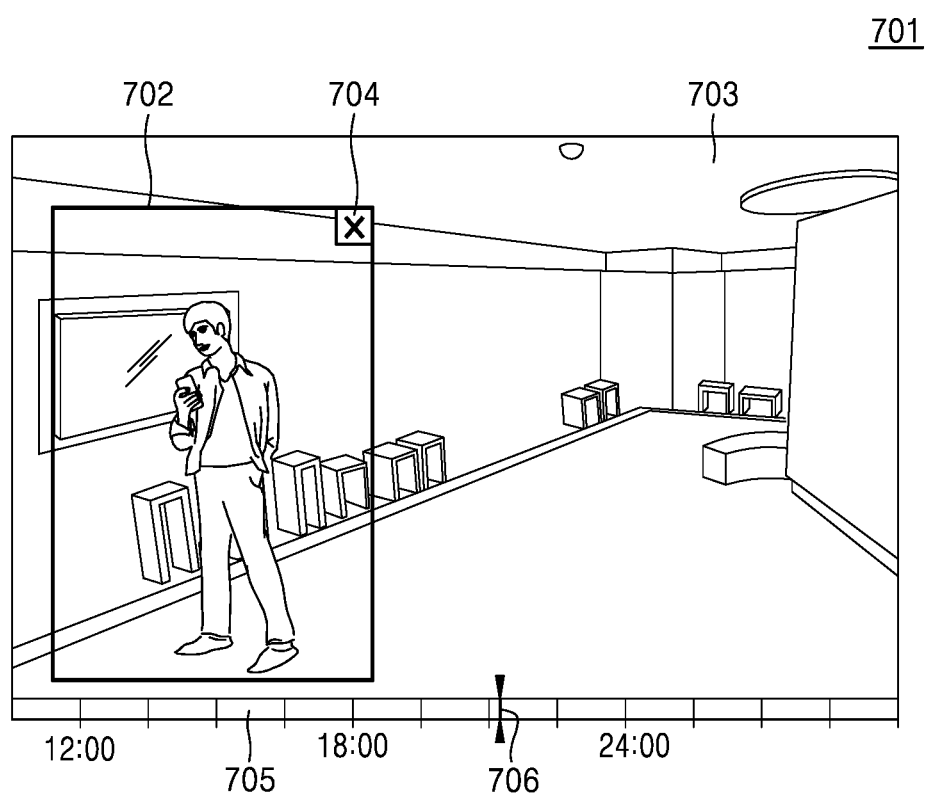
FIG. 8 illustrates a display image displayed on a display, according to an embodiment.

FIG. 8 illustrates a display screen 701 displayed on the display 110, according to an embodiment. For convenience of description, it is assumed that a user has set a region of interest (601 in FIG. 3) as shown in FIG. 3.

In this case, the display screen 701 may include a region 702 in which an image corresponding to the region of interest is displayed, a region 703 in which an image corresponding to a remaining region excluding the region of interest is displayed, and a time slider 705.

As described above, the controller 130 may obtain an input referring to a knob 706 on the time slider 705 and determine a display time point of a second image displayed in the region 702 in which the image corresponding to the region of interest is displayed. For example, when the user moves the knob 706 to the left on the time slider 705, an image earlier than a current display image may be displayed in the region 702 in which the image corresponding to the region of interest is displayed.

The user may terminate watching images using the method described above by performing an input of a region-of-interest view exit button 704. When the image watching is terminated, the controller 130 may display only either a first layer or a second layer on the display 110.

Figure 9:
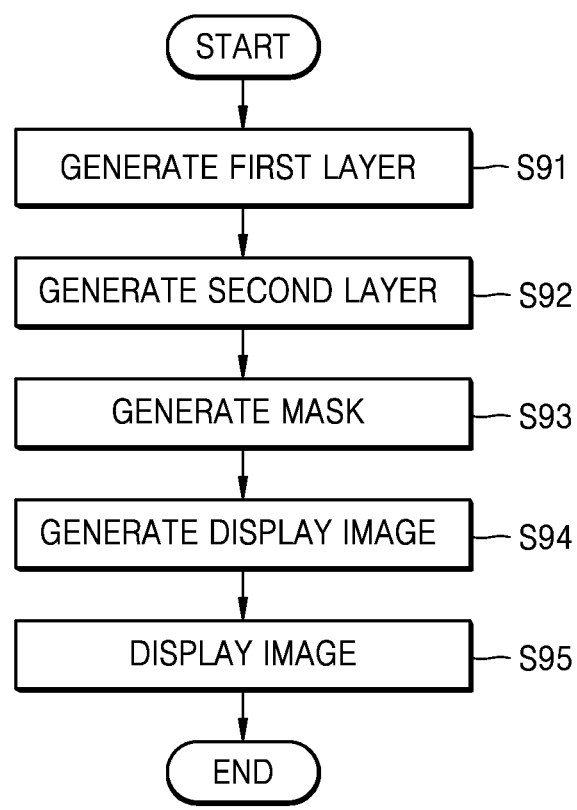
FIG. 9 is a flowchart of an image providing method performed by the image providing apparatus of FIG. 1.

FIG. 9 is a flowchart of an image providing method performed by the image providing apparatus 100 of FIG. 1. Hereinafter, redundant descriptions made with reference to FIGS. 1 through 8 will be omitted.

In an embodiment, the controller 130 may generate a first layer, on which a first image is displayed, in operation S91. Similarly, the controller 130 may generate a second layer, on which a second image is displayed, in operation S92. At this time, the first image may be different from the second image. For example, the first image may be a live image obtained by the surveillance camera 200 and the second image may be a recorded image obtained by the surveillance camera 200 in the past. At this time, the recorded image may have been stored in the image storage device 300. Meanwhile, the term "layer" used in the first layer and the second layer may refer to a virtual layer used to overlap images. For example, when the first layer overlaps the second layer, the second image displayed on the second layer may be covered with the first image displayed on the first layer in an overlapping range between the first layer and the second layer.

In an embodiment, the controller 130 may generate a mask based on a region of interest in the first image in operation S93.

Here, the term "region of interest" may refer to a region to be monitored in an image which has a different capturing viewpoint than an image currently watched by a user. For example, when the user finds a person acting suspiciously while watching a live image, the user may set a region including the person as the region of interest in the live image to closely observe the past behavior of the person.

As described above, the region of interest may be set based on a user input. In other words, the controller 130 may set the region of interest based on a user input with respect to the first image.

In detail, the controller 130 may obtain user inputs with respect to a first point on the first image and a second point different from the first point and may determine the region of interest based on the first and second points. At this time, a first input and a second input may be consecutive inputs.

Here, the "consecutive inputs" may refer to a plurality of inputs connected via a drag input. For example, the first input may be an input (e.g., a click, a tap, or a touch) for the first point and the second input may be an input (e.g., release of a drag, a double-click, or a double-touch) for the second point.

In an embodiment, the controller 130 may change at least one of the position and the size of the region of interest determined based on the user inputs. For example, in the case where the person in the region of interest moves to the right and is not in the region of interest, the user may expand or move the region of interest to the right such that the person to be observed is in a changed region of interest.

Meanwhile, the changing of the region of interest may be performed by the controller 130. In an embodiment, the controller 130 may update the region of interest based on a moved position of an object of interest in the first image. In the previous embodiment, the user has changed at least one of the position and the size of the region of interest according to the movement of the person, i.e., the object of interest. However, in the current embodiment, the controller 130 may recognize the object of interest, locate the object of interest in an image, and change at least one of the position and the size of the region of interest based on the obtained location of the object of interest. Accordingly, a more meaningful region of interest may be set.

The controller 130 may obtain a user input for setting at least one region of interest and set the at least one region of interest in response to the user input. In this case, there may be one or more regions of interest in one image.

In an embodiment, the controller 130 may generate the mask based on the position of the region of interest in the first image. In other words, the controller 130 may generate the mask including position information of the region of interest in the first image.

The generated mask may be used to extract and/or exclude a region corresponding to the region of interest or a remaining region excluding the region corresponding to the region of interest from the first or second layer.

In an embodiment, the controller 130 may generate a display image based on at least one of the first layer, the second layer, and the mask in operation S94.

In an embodiment, the controller 130 may generate a masked second layer by applying the mask to the second layer. In detail, the controller 130 may process the second layer such that a region corresponding to the remaining region excluding the region of interest on the second layer is transparent, thereby generating the masked second layer. In other words, the controller 130 may generate the masked second layer on which only the region corresponding to the region of interest is displayed and the remaining region is transparent. Here, that a certain region of a current layer is "transparent" may refer to that an image of a layer below the current layer is displayed through the current layer. For example, a display image of the first layer below the masked second layer may be displayed in the region corresponding to the remaining region excluding the region of interest on the masked second layer.

Thereafter, the controller 130 may generate the display image by overlapping the first layer with the masked second layer.

In another embodiment, the controller 130 may generate a masked first layer by applying the mask to the first layer. In detail, the controller 130 may process the first layer such that a region corresponding to the region of interest on the first layer is transparent, thereby generating the masked first layer. In other words, the controller 130 may generate the masked first layer on which only a remaining region excluding the region corresponding to the region of interest is displayed and the region of interest is transparent.

Thereafter, the controller 130 may generate the display image by overlapping the second layer with the masked first layer.

In another embodiment, the controller 130 may generate the display image based on a first partial region, which is a remaining region excluding a region corresponding to a region of interest on the first layer, and a second partial region, which corresponds to the region of interest on the second layer. In other words, the controller 130 may generate the display image by merging the first partial region and the second partial region into a single image.

In an embodiment, the controller 130 may display the display image, which has been generated using the method described above, on the display 110 in operation S95. At this time, the controller 130 may obtain a user input regarding a display time point of the second image. For example, the controller 130 may obtain the user input regarding the display time point of the second image by displaying a time slider showing at least one display time point and obtaining a user input on the time slider.

An image providing method according to an embodiment can be embodied as computer-readable codes on a computer-readable recording medium. The computer-readable recording medium is any data storage device that can store data which can thereafter be read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributed manner. Also, functional programs, code, and code segments for accomplishing embodiments can be easily construed by programmers skilled in the art to which embodiments pertains.

While this present disclosure has been described with reference to embodiments shown in the drawings, it will be understood by those skilled in the art that the embodiments are just exemplary and various changes in form and details may be made therein.

The invention claimed is:

1. An image providing method comprising:
   generating a first layer on which a first image is displayed;
   generating a second layer on which a second image is displayed, the second image being different from the first image;
   generating a mask based on a position of a region of interest in the first image; and
   generating a display image based on at least one of the first layer, the second layer, and the mask,
   wherein the generating of the display image comprises generating the display image based on a first partial region and a second partial region, the first partial region being a remaining region excluding a region corresponding to the region of interest on the first layer, and the second partial region corresponding to the region of interest on the second layer.

2. The image providing method of claim 1, wherein the generating of the display image comprises:
   generating a masked second layer by applying the mask to the second layer; and
   generating the display image by overlapping the first layer with the masked second layer,
   wherein the generating of the masked second layer comprises processing the second layer such that a region corresponding to the remaining region excluding the region of interest is transparent on the second layer.

3. The image providing method of claim 1, wherein the generating of the display image comprises:
   generating a masked first layer by applying the mask to the first layer; and
   generating the display image by overlapping the second layer with the masked first layer,
   wherein the generating of the masked first layer comprises processing the first layer such that the region corresponding to the region of interest is transparent on the first layer.

4. The image providing method of claim 1, wherein the generating of the mask comprises setting the region of interest based on a user input with respect to the first image.

5. The image providing method of claim 4, wherein the setting of the region of interest comprises:
   obtaining a first input for a first point on the first image;
   obtaining a second input for a second point on the first image, the second input being consecutive to the first input; and
   determining the region of interest based on the first input and the second input.

6. The image providing method of claim 5, wherein the setting of the region of interest further comprises, after the determining of the region of interest, changing at least one of the position and a size of the region of interest based on the user input.

7. The image providing method of claim 5, wherein the generating of the mask further comprises updating the region of interest based on a moved position of an object of interest in the first image.

8. The image providing method of claim 1, wherein a plurality of regions of interest are provided, and the generating of the mask comprises generating the mask based on a position of each of the plurality of regions of interest.

9. The image providing method of claim 1, further comprising displaying the display image.

10. The image providing method of claim 9, wherein the first image is a live image, the second image is a recorded image, and the generating of the second layer comprises obtaining a user input regarding a display time point of the second image.

11. The image providing method of claim 10, wherein the displaying of the display image comprises further displaying a time slider showing at least one display time point, and the obtaining of the user input regarding the display time point comprises obtaining the user input on the time slider.

12. An image providing apparatus comprising a controller configured to generate a first layer, a second layer, and a mask and to generate a display image based on at least one of the first layer, the second layer, and the mask, wherein the controller generates the first layer on which a first image is displayed, generates the second layer on which a second image is displayed, the second image being different from the first image, generates the mask based on a position of a region of interest in the first image, and generates the display image based on the at least one of the first layer, the second layer, and the mask, and wherein the controller generates the display image based on a first partial region and a second partial region, the first partial region being a remaining region excluding a region corresponding to the region of interest on the first layer, and the second partial region corresponding to the region of interest on the second layer.

13. The image providing apparatus of claim 12, wherein the controller generates a masked second layer by applying the mask to the second layer and generates the display image by overlapping the first layer with the masked second layer, and wherein masked second layer is obtained by processing the second layer such that a region corresponding to the remaining region excluding the region of interest is transparent on the second layer.

14. The image providing apparatus of claim 12, wherein the controller generates a masked first layer by applying the mask to the first layer and generates the display image by overlapping the second layer with the masked first layer, and wherein the masked first layer is obtained by processing the first layer such that the region corresponding to the region of interest is transparent on the first layer.

15. The image providing apparatus of claim 12, wherein the controller sets the region of interest based on a user input with respect to the first image.

16. The image providing apparatus of claim 15, wherein the controller is further configured to update the region of interest based on a moved position of an object of interest in the first image.

17. The image providing apparatus of claim 12, wherein a plurality of regions of interest are provided, and the controller generates the mask based on a position of each of the plurality of regions of interest.

18. The image providing apparatus of claim 12, wherein the controller displays the display image on a display.

* * * * *